United States Patent Office 3,269,796
Patented August 30, 1966

3,269,796
PROCESS OF IMPARTING WASH-WEAR PROPERTIES AND FIXING CREASES IN CELLULOSIC FABRICS BY NITROGEN DIOXIDE TREATMENT
Russell M. H. Kullman, Metairie, and Terrence W. Fenner and Robert M. Reinhardt, New Orleans, La., assignors to the United States of America as represented by the Secretary of Agriculture
No Drawing. Filed Jan. 16, 1963, Ser. No. 251,986
5 Claims. (Cl. 8—116)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for imparting durable creases to cellulosic textile and to articles fabricated therefrom. More particularly, it provides a method especially suited to treating completed garments to give them permanent creases and other desirable properties, such as smoothness, and making these properties durable to laundering.

The process consists of exposing cellulosic material, or chemically modified cellulosic material to gaseous nitrogen dioxide. The preferred way of practicing the invention involves creasing and smoothing the yard goods or garments by pressing, then placing the material in a container or chamber that may readily have air replaced by gaseous nitrogen dioxide, keeping the atmosphere about the yard goods or garments saturated with the $N_2O_4$ during the exposure time. The preferred temperature is about 25° C., and the exposure time is about 1 hour. The reaction time may be shortened by raising the temperature. The textile material is then removed, and can be washed or exposed to a current of air to free the material of residual gaseous nitrogen dioxide.

The process is most effective if the cellulosic material is essentially at its normal moisture content.

The smooth drying areas of samples were rated by comparison with the American Association of Textile Chemists and Colorists Standard Test Method 88–1960 (tentative), "Wash-and-Wear Fabrics—Appearance After Home Laundering," which is published in the 1960 Technical Manual of the American Association of Textile Chemists and Colorists, volume 36, pp. 148–151. Nitrogen analyses revealed less than about 0.1% nitrogen in the analyzed samples. Creases were rated according to the following scale:

5—Excellent
4—Good
3—Fair
2—Poor
1—Very Poor (faint appearance)
0—Not Visible.

The invention is further illustrated by the following examples.

*Example 1*

Sample 1–A.—A sample of 80 x 80 cotton print cloth was carefully pressed with a hand iron to introduce a sharp crease in the warp direction, and to smooth the flat areas.

Sample 1–B.—A sample of 80 x 80 cotton print cloth was pressed as was Sample 1–A, and then dampened with water, wrapped on a cylindrical glass tube, placed in a glass cylindrical barrel. The barrel was provided with a plastic cover with an inlet and outlet tube. Nitrogen dioxide was introduced through the inlet tube until the air in the barrel was predominantly displaced (visually observable due to the brownish color of nitrogen dioxide gas). A constant slight flow of nitrogen dioxide gas into the cylinder was maintained for a period of one hour at room temperature (25° C.), keeping the atmosphere saturated with $N_2O_4$ about the fabric throughout the exposure time. The sample was then rinsed in tap water.

Sample 1–C.—A sample of 80 x 80 cotton print cloth was prepared as was Sample 1–A; then the crease only was dampened with water, which was saturated with nitrogen dioxide gas. The sample was then laid in a flat metal pan for one hour at room temperature, and the crease was kept damp by striping it with the water saturated with nitrogen dioxide gas during this time.

Sample 1–D.—A sample of 80 x 80 cotton print cloth was prepared as was Sample 1–A. The sample was then wrapped on a glass tube, and treated with nitrogen dioxide, as was Sample 1–B.

This sample contained only normal moisture content pior to treatment with nitrogen dioxide gas.

The four samples above at the conclusion of the reaction period were laundered in an automatic home washer, using the regular wash cycle; and tumble dried. The samples were evaluated, and their appearances are listed in Table I.

TABLE I.—WASH-WEAR RATING

| Sample | Smooth Areas | Crease |
|---|---|---|
| 1A | 1 | 1 |
| 1B | 2 | 3 |
| 1C | 3 | 3 |
| 1D | 2 | 4 |

*Example 2*

Example 1 was repeated wherein the fabric used was mercerized cotton print cloth. The samples were evaluated as before, and the results listed in Table II.

TABLE II.—WASH-WEAR RATING

| Sample | Smooth Areas | Crease |
|---|---|---|
| 2A | 1 | 1 |
| 2B | 2 | 4 |
| 2C | 2 | 1 |
| 2D | 2 | 4 |

*Example 3*

Example 1 was repeated wherein the fabric used was partially carboxymethylated coton having a degree of substitution of about 0.07 carboxymethyl groups per anhydroglucose unit of the cellulose, prepared by the process described in United States Patent Number 2,448,153.

TABLE III.—WASH-WEAR RATING

| Sample | Smooth Areas | Crease |
|---|---|---|
| 3A | 1 | 1 |
| 3B | 3 | 4 |
| 3C | 3 | 1 |
| 3D | 3+ | 5 |

*Example 4*

Example 1 was repeated wherein the fabric used was hydroxyethylated cotton having a degree of subsitution of about 0.3 hydroxyethyl groups per anhydroglucose unit of the cellulose, prepared by the process described by Lawrie and coworkers in the Journal of the Society of Dyers and Colourists, volume 56, pp. 6–17 (1940).

TABLE IV.—WASH-WEAR RATING

| Sample | Smooth Areas | Crease |
|---|---|---|
| 4A | 1 | 0 |
| 4B | 1 | 1 |
| 4C | 2 | 2 |
| 4D | 3 | 5 |

We claim:

1. A process for treating a cellulosic fabric to achieve "wash-wear" properties as manifested by smooth drying areas and permanent creases, which comprises creasing by hot pressing a cellulosic fabric selected from the group consisting of cotton, mercerized cotton, carboxymethylated cotton, and hydroxyethylated cotton; exposing the thus-creased cellulosic fabric at a temperature of about from 20° to 30° C. and at the particular room equilibrated moisture content of the respective cellulosic fabric for a period of about 1 hour to an atmosphere saturated with nitrogen dioxide; then freeing the fabric from all $N_2O_4$.

2. A process of claim 1, wherein the cellulosic fabric is cotton.
3. A process of claim 1, wherein the cellulosic fabric is mercerized cotton.
4. A process of claim 1, wherein the cellulosic fabric is carboxymethylated cotton.
5. A process of claim 1, wherein the cellulosic fabric is hydroxyethylated cotton.

References Cited by the Examiner
UNITED STATES PATENTS

| | | | |
|---|---|---|---|
| 2,338,587 | 1/1944 | Kenyon et al. | 8—129 X |
| 2,423,707 | 7/1947 | Kenyon et al. | 8—116 X |
| 2,448,892 | 9/1948 | Kenyon et al. | 8—116 |
| 3,052,511 | 9/1962 | Reinhardt et al. | 8—116 X |

FOREIGN PATENTS 779,820    7/1957    Great Britain.

NORMAN G. TORCHIN, *Primary Examiner.*
H. WOLMAN, *Assistant Examiner.*